(12) United States Patent
Yamasaki

(10) Patent No.: US 7,883,011 B2
(45) Date of Patent: Feb. 8, 2011

(54) INFORMATION DISTRIBUTION METHOD

(75) Inventor: Hitoshi Yamasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1137 days.

(21) Appl. No.: 11/528,436

(22) Filed: Sep. 28, 2006

(65) Prior Publication Data

US 2007/0205268 A1    Sep. 6, 2007

(30) Foreign Application Priority Data

Mar. 3, 2006    (JP)    ............................. 2006-058216

(51) Int. Cl.
     *G06K 5/00*    (2006.01)
(52) U.S. Cl. ........................ 235/380; 235/381; 235/383; 235/385; 235/375; 382/224; 707/102; 705/1; 705/8; 705/14
(58) Field of Classification Search ................. 235/380, 235/381, 383, 385, 375; 382/224; 707/102; 705/1, 8, 14
See application file for complete search history.

(56) References Cited

U.S. PATENT DOCUMENTS

2003/0163359 A1*    8/2003    Kanesaka ...................... 705/8
2004/0024611 A1*    2/2004    Agui ............................. 705/1
2009/0226099 A1*    9/2009    Kundu et al. ................ 382/224

FOREIGN PATENT DOCUMENTS

| JP | 2002-366771 | 12/2002 |
|---|---|---|
| JP | 2003-157391 | 5/2003 |
| JP | 2004-318279 | 11/2004 |

\* cited by examiner

*Primary Examiner*—Allyson N Trail
(74) *Attorney, Agent, or Firm*—Staas & Halsey LLP

(57) ABSTRACT

An information processing apparatus distributes service information related to an electronic transaction to a user who performs the electronic transaction. The information processing apparatus includes a storage unit that stores a service information group including the service information, transaction information relating to the electronic transaction, and user information relating to the user; a service information selector that selects the service information to be transmitted to the user from the service information group based on the transaction information and the user information; and a destination address selector that selects, from a plurality of destination addresses associated with the user, a destination address to which the service information selected by the service information selector is to be distributed.

9 Claims, 6 Drawing Sheets

INFORMATION DISTRIBUTION METHOD

BACKGROUND OF THE INVENTION

1. Field of the Invention

The present invention relates to information processing apparatuses, information distribution methods, and information distribution programs. More specifically, the present invention relates to an information processing apparatus, an information distribution method, and an information distribution program for distributing information desired by a user in connection with a transaction, for example, a card transaction settlement to an address set by the user depending on the contents of the information.

2. Description of the Related Art

Recently, card-based services have been increasingly provided. A variety of cards are currently in use, and, for example, users of credit cards can receive services associated with the credit cards used.

Users of such cards have had information distributed to preset mail addresses from card companies or the like, such as information relating to the services, information relating to the credit cards, and campaign information. Such information is sent from credit card companies or the like regardless of users' desirable conditions, such as stores, and is distributed without solicitation by the user from card companies or the like regardless of the contents of the information to be distributed.

Japanese Unexamined Patent Application Publication No. 2002-366771 discloses a system for providing information for credit card use. In an information distribution system disclosed in this publication, card information is transmitted to a managing computer, and a message with an advertisement indicating that the card has been used is sent by e-mail to a pre-registered mail address.

However, there are problems associated with the information distribution system disclosed in the above-noted publication. While the above-noted publication discloses that information is distributed by e-mail when a card is used, a destination address is not specified or a destination address is not identified depending on the information to be distributed. Therefore, unsolicited information may be distributed to the users of cards, such as credit cards, or the users may miss opportunities to use the released information depending on the information to be distributed.

SUMMARY OF THE INVENTION

Accordingly, the present invention distributes card-related service information to a user's desired destination address depending on the contents of the service information to be distributed from a card company or the like.

According to an aspect of the present invention, there is provided an information processing apparatus for distributing service information related to an electronic transaction a user who performs the electronic transaction. The information processing apparatus includes a storage unit that stores a service information group including the service information, transaction information relating to the electronic transaction, and user information relating to the user; a service information selector that selects the service information to be transmitted to the user from the service information group based on the transaction information and the user information; and a destination address selector that selects from a plurality of destination addresses associated with the user a destination address to which the service information selected by the service information selector is to be distributed.

According to the present invention, service information is distributed to the user of a card by identifying a destination address desired by the user depending on the contents of the service information and delivering the service information to the address. It is therefore possible to more effectively provide service information, while preventing the user from missing the opportunity to use the service information, thereby encouraging the user to use the card.

DESCRIPTION OF THE PREFERRED EMBODIMENTS

Figure 1:
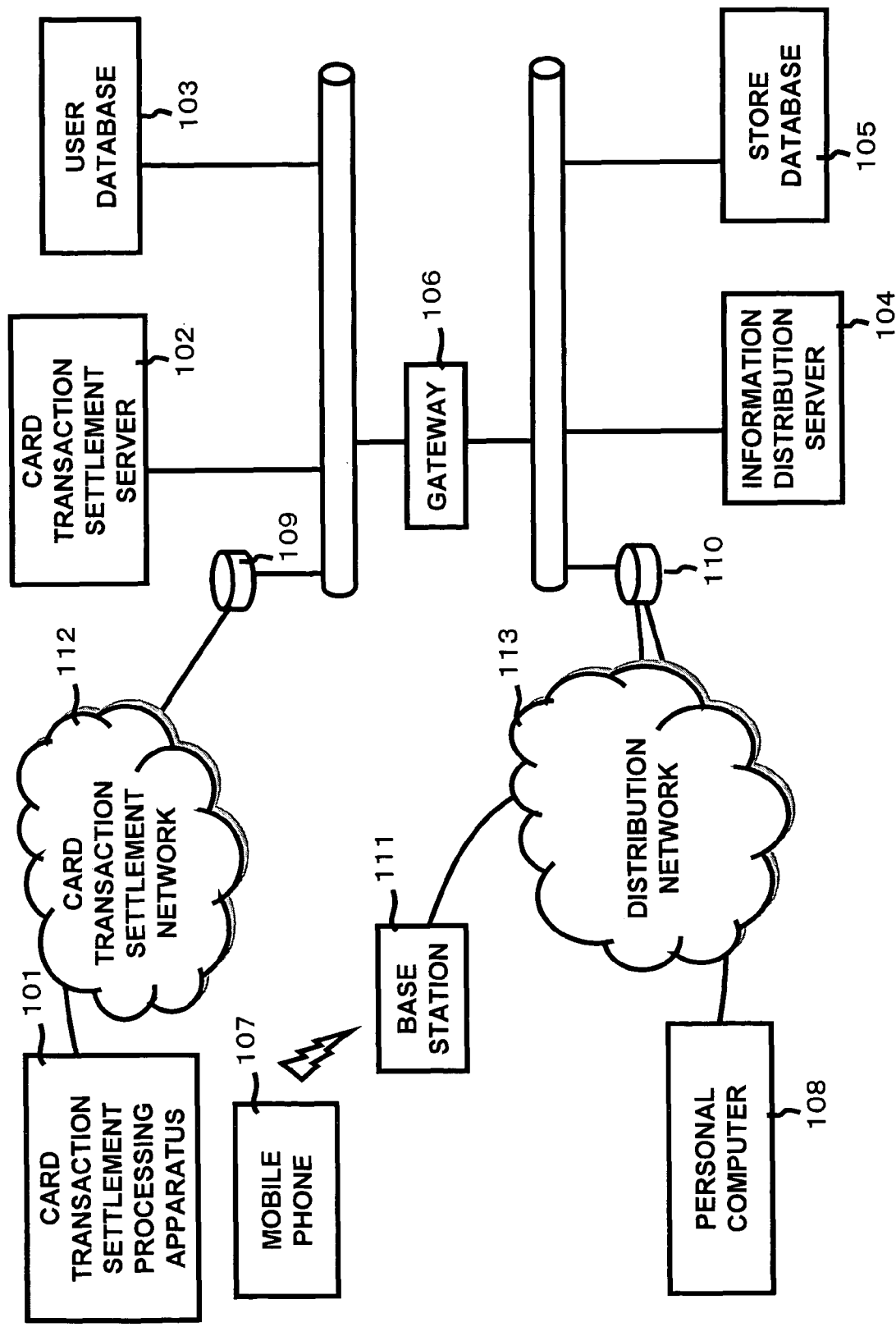
FIG. 1 is a diagram showing a confirmation of an information distribution system according to an embodiment of the present invention.

FIG. 1 is a diagram showing a configuration of an information distribution system according to an embodiment of the present invention.

As a example of a user transaction, a user card transaction is used. A card used in this embodiment is a card by which commodities can be purchased or services can be received on credit and/or debit, such as a credit card or a debit card. Alternatively, a card into which points are accumulated on purchases may be used. Moreover, any medium which can be used for a transaction, such as purchasing may be used, for example, without limitation an RFID (Radio Frequency Identification) enabled medium.

A card user of a card (hereinafter referred to simply as a "user") purchases a commodity and pays for the commodity with the card. Card payment is settled by a card transaction settlement processing apparatus 101, such as POS (Point-of-sale). The card transaction settlement processing apparatus 101 is connected to a card transaction settlement server 102 through a router 109. The card transaction settlement processing apparatus 101 and the card transaction settlement server 102 are connected via a card transaction settlement network 112. The card transaction settlement processing apparatus 101 transmits information including card ID information and commodity cost, as well as card use information including the purchased commodity, the time when the commodity was purchased, and the place where the commodity was purchased, to the card transaction settlement server 102.

If there is other predetermined information, such as the purchase limit up to which the card can be used or the expiration date, the information such as the purchase limit or the expiration date is also transmitted together with the card use information to the card transaction settlement server 102.

Figure 4:
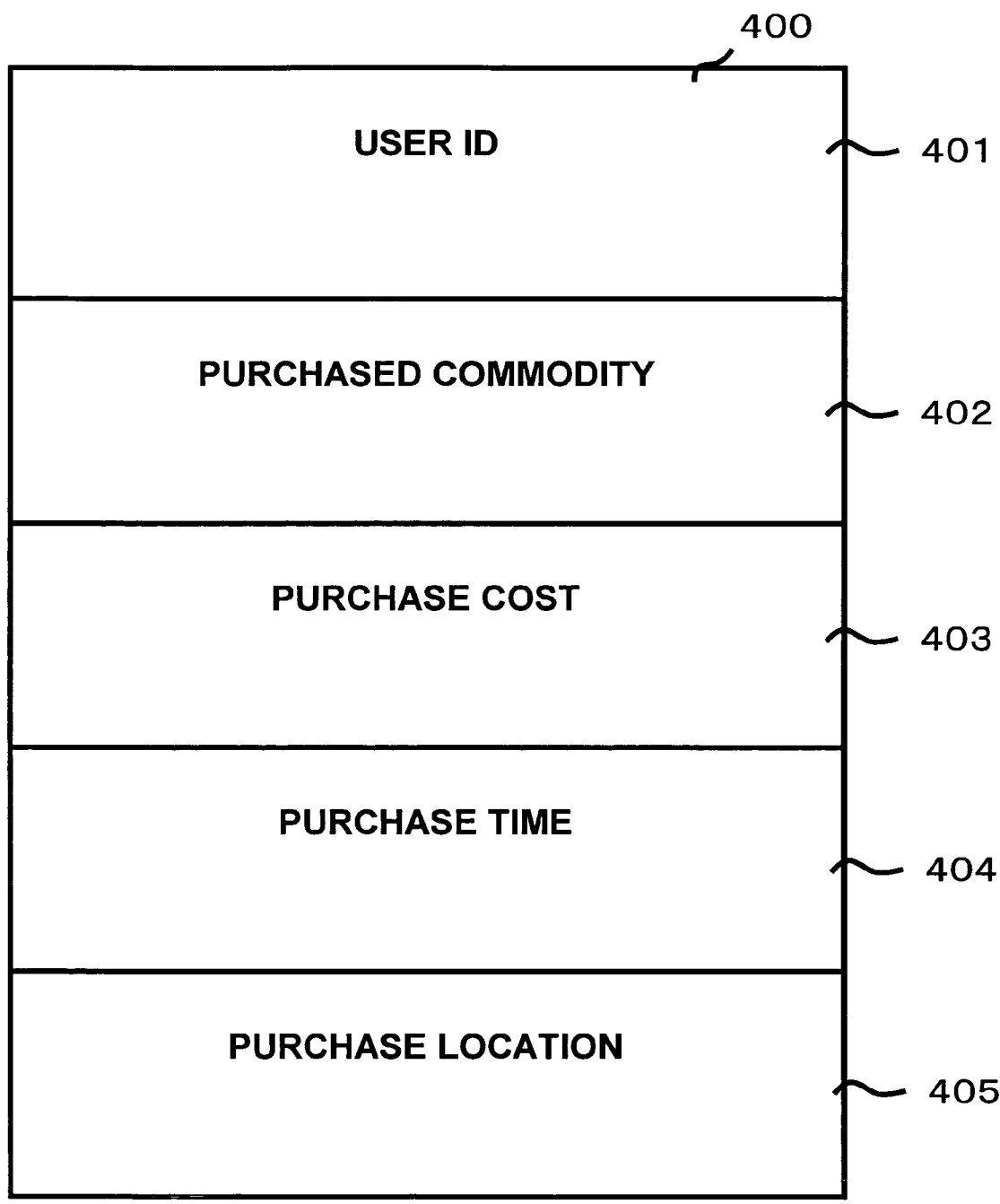
FIG. 4 is diagram showing a card use information table 400 according to an embodiment of the present invention.

FIG. 4 illustrates an example of the card use information. The card use information is transmitted as a card use information table 400 from the card transaction settlement processing apparatus 101 to the card transaction settlement server 102. The card use information table 400 includes, for example, a user ID 401, a purchased commodity 402 representing the purchased commodity, a purchase cost 403 representing the cost of the purchased commodity, a purchase time 404 representing the time when the commodity was purchased, and a purchase location 405 representing the location where the commodity was purchased.

Figure 5:
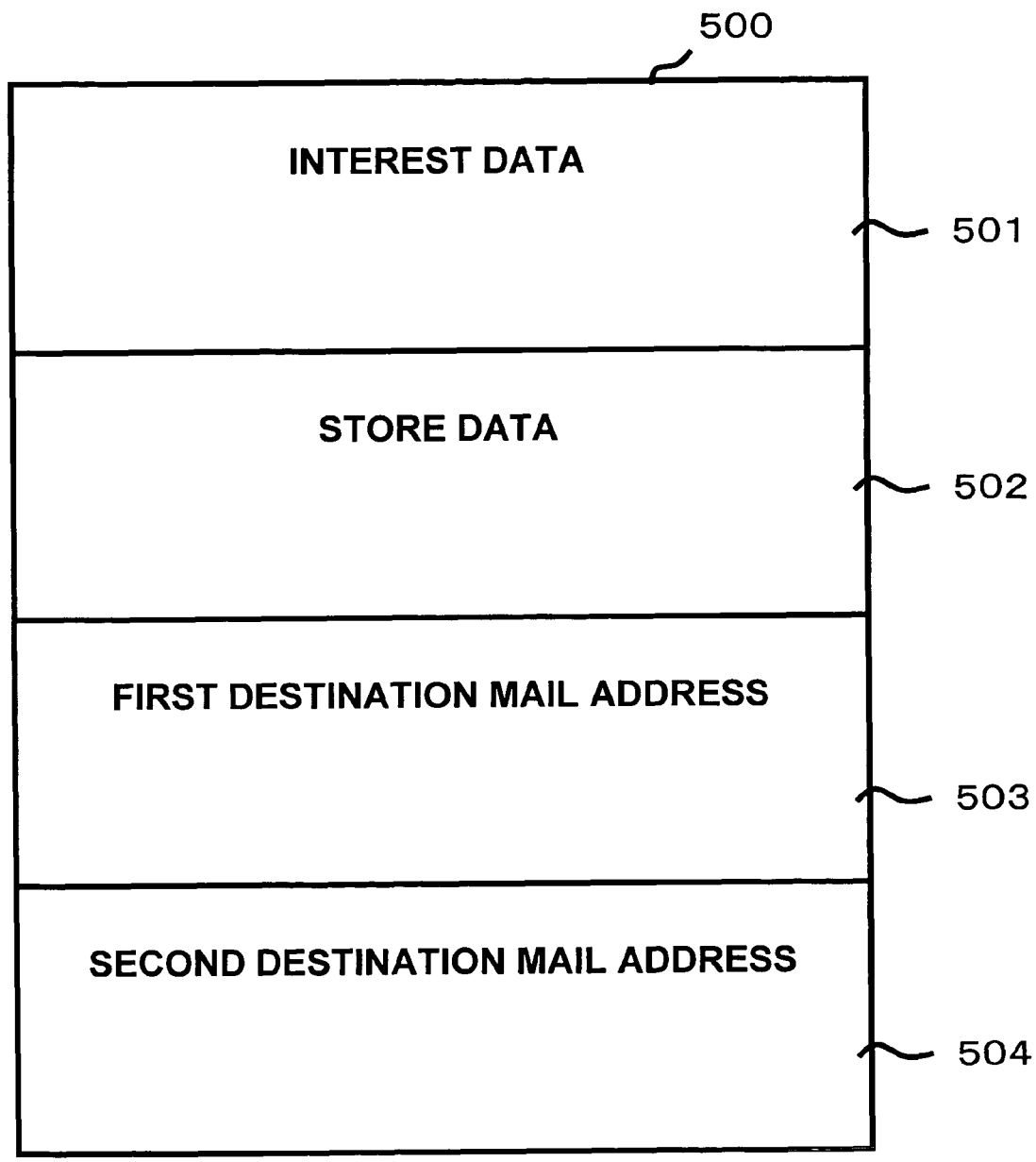
FIG. 5 is a diagram showing a user information table 500 according to an embodiment of the present invention.

A user database 103 has stored therein user information regarding the user. The user information is stored in the user database 103 in the form of a user information table 500 shown in FIG. 5. The user information table 500 includes, for example, interest data 501 representing user's interests, store data 502 representing stores frequently used by the user, a first destination address 503 to which service information including real-time information that is useful to be reported to the user in real-time is distributed, and a second destination address 504 to which service information including non-real-time information that need not be reported to the user in real-time is distributed. The user destination address 503, 504 can be street mail and/or electronic mail address. Real time is a short time from a transaction time, when the information distribution server 104 distributes service information 600 to the user's address. Moreover, the real time can be close to the purchase time 404 as configured, for example, within one hour of purchase time 404. Real-time service information is determined according to the User information.

For example, the first destination mail address 503 is a mail address of a mobile device, such as a mobile phone 107, and the second destination mail address 504 is a mail address of a personal computer 108. The number of destination mail addresses is not limited to two, and more than two mail addresses may be set as destination addresses to which service information is distributed. Further, the condition of the first mail address and the condition of the second mail address, such as real-time information, non real-time information, can be configurable. An information distribution server 104 distributes the service information to the first destination mail address 503 or the second destination mail address 504, based upon the configured condition of the first mail address and the condition of the second mail address associated with the user, the service information to be distributed and the card use information of the user.

The card transaction settlement server 102 transmits the card use information and the user information stored in the user database 103 to an information distribution server 104. A gateway 106 is provided between the card transaction settlement server 102 and the information distribution server 104 for increasing security.

Figure 6:
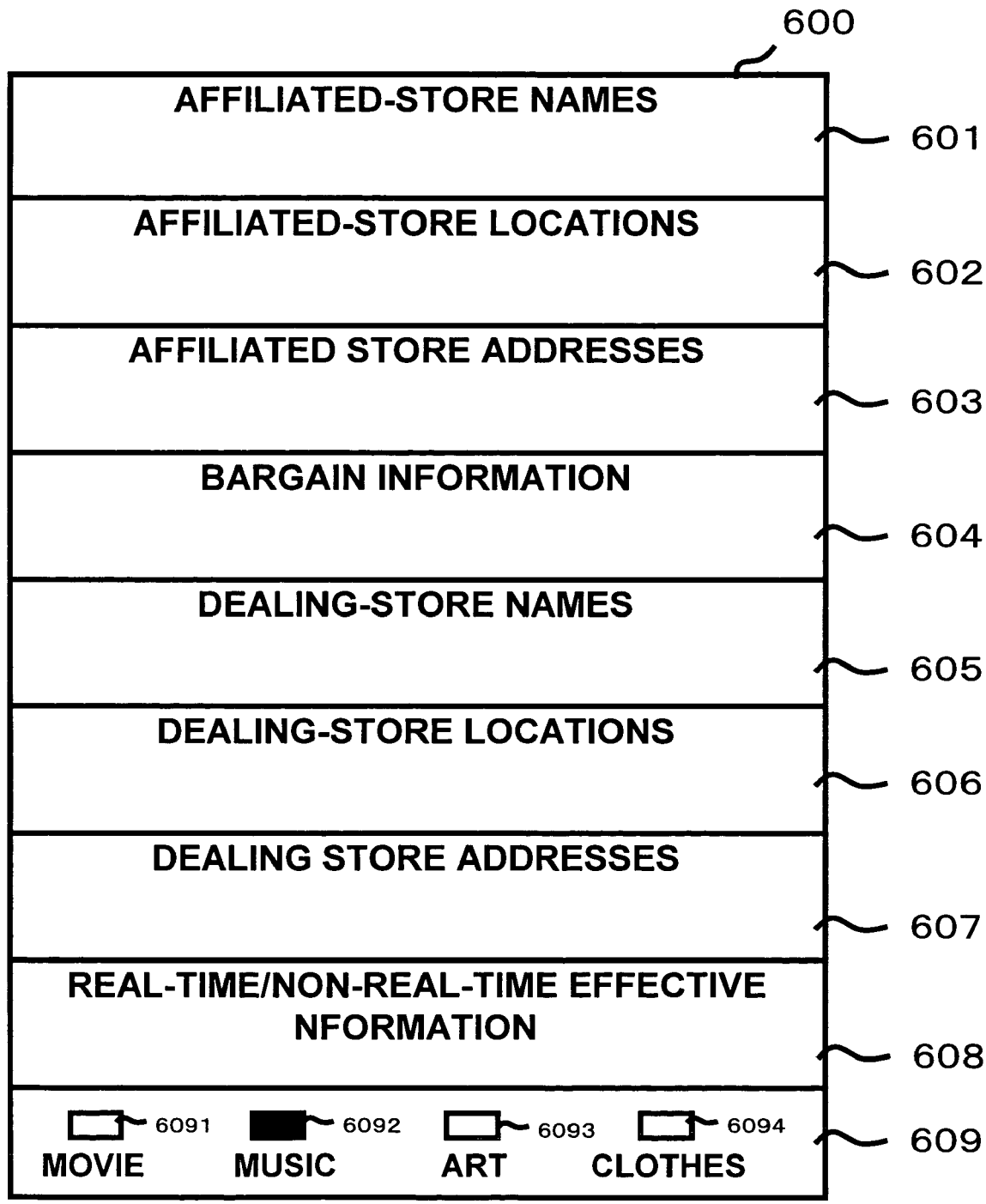
FIG. 6 is a diagram showing a service information table 600 according to an embodiment of the present invention.

The gateway 106 is a device used when a different network or the like is connected, and allows communication of data across different media or protocols on a network by performing conversion. The information distribution server 104 retrieves service information from a store database 105. The service information is stored in the store database 105 in the form of a service information table 600 shown in FIG. 6. In this embodiment, for example, the service information table 600 includes affiliated-store names 601 representing the names of the stores affiliated with the store where the user purchased the commodity, affiliated-store locations 602 representing the locations of the affiliated stores, affiliated store addresses 603 representing the addresses of the affiliated stores, bargain information 604 representing bargain information at the affiliated stores, dealing-store names 605 representing the names of other stores dealing with the commodity purchased by the user, dealing-store locations 606 representing the locations of the dealing stores, dealing store addresses 607 representing the addresses of the dealing stores, and real-time/non-real-time information 608 indicating whether the service information is real-time information to be transmitted to the user in real-time or non-real-time information that need not be transmitted to the user in real-time.

The information distribution server 104 uses the card use information and user information received from the card transaction settlement server 102 to select possible service information usable by the user from the store database 105.

Then, the information distribution server 104 distributes the selected service information to the user. If the selected service information is real-time information to be reported to the user in real-time, the service information is distributed to the pre-registered mail address of the mobile phone 107. If the selected service information is non-real-time service information that need not be confirmed by the user in real-time, the service information is distributed to the mail address of the personal computer 108. The information distribution server 104, the mobile phone 107, and the personal computer 108 are connected via a distribution network 113, which can be different from the card transaction settlement network 112.

Thus, when using the user information to provide service information to the user, the information distribution server 104 distributes the service information to different destination addresses depending on the predetermined conditions of the service information (e.g., whether the service information corresponds or matches a user profile, distribution type of the service information (e.g., real-time, non-real-time, etc., or any combinations thereof) and conditions of information receipt profile for the user (e.g., destination address configuration of the user for a type of service information), thereby effectively providing information to the user.

An electronic transaction includes a commodity purchase by card payment. The processing performed by a destination address selecting unit and a distribution control unit corresponds to the processing performed by a control unit 201 in the information distribution server 104, discussed below. The card transaction settlement server 102 corresponds to an electronic transaction apparatus, and the user database 103 corresponds to a user information management apparatus. The card use information corresponds to transaction information from the card transaction settlement server 102, and the user information corresponds to user information from the user database 103.

Figure 2:
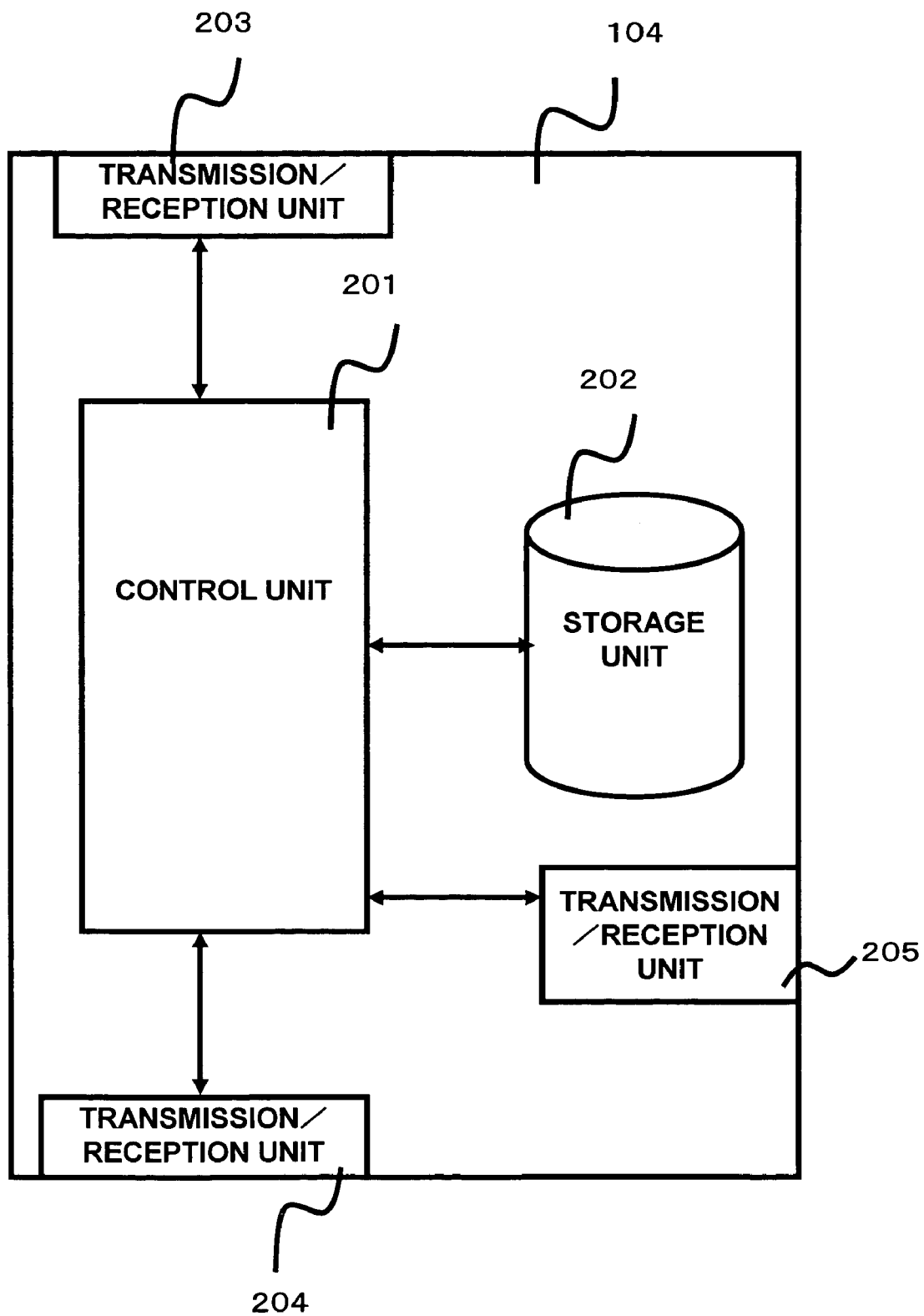
FIG. 2 is a block diagram of an information processing apparatus, according to an embodiment of the present invention.

FIG. 2 is a hardware block diagram of the information distribution server 104 according to an embodiment of the present invention.

The information distribution server 104 includes a control unit 201, a storage unit 202, and transmission/reception units 203, 204, and 205.

The control unit 201 is composed of a computer including a central processing unit (CPU), a read-only memory (ROM), and a random-access memory (RAM), and controls the storage unit 202 and the transmission/reception units 203, 204, and 205. The storage unit 202 and the transmission/reception units 203, 204, and 205 are controlled by executing a control program of implementing the processes of the embodiments, stored, for example, in the ROM of the control unit 201. The medium having the control program stored therein is not limited to the ROM, and may be any other recording medium corresponding to the ROM.

The storage unit 202 generally includes a ROM, a RAM, and so forth. The storage unit 202 may be a removable recording medium, and may be a memory designed such that the data recorded thereon is not lost when the power is turned off, such as a flash memory.

The transmission/reception units 203, 204, and 205 are connected via a network to the card transaction settlement server 102, the store database 105, and networked target information processing apparatuses as destinations to which information is to be distributed. The information processing apparatuses in communication with the information distribution server 104 as the destinations are the mobile phone 107 and personal computer 108 used by the user. The card transaction settlement server 102 and the information distribution server 104 are connected through the gateway 106, and the mobile phone 107 and the personal computer 108 are connected to the information distribution server 104 through a router 110. The transmission/reception units 203, 204, and 205 may not be physically separate, and may be configured such that transmission to and reception from the card transaction settlement server 102, the store database 105, the mobile phone 107, and the personal computer 108 are controlled by the control unit 201.

When the transmission/reception unit 203 receives the card use information and the user information from the card transaction settlement server 102, the information distribution server 104 stores the card use information and the user information in the storage unit 202. The information distribution server 104 also receives the service information from the store database 105 via the transmission/reception unit 205, and stores the service information in the storage unit 202. The control unit 201 controls reception of the card use information and the user information from the card transaction settlement server 102 and reception of the service information from the store database 105.

The control unit 201 refers to the card use information and the user information, and selects service information that is determined to be useful for the user from the store database 105.

If the selected service information is real-time information to be transmitted to the user in real-time, the control unit 201 controls the transmission/reception unit 204 to distribute the service information to a mail address set as a destination address desired by the user to which the real-time information is to be distributed. For example, the mail address set herein as the destination address desired by the user to which the real-time information is distributed is, for example, the mail address of the mobile phone 107. The selected service information is transmitted to the mobile phone 107 through a base station 111.

If the selected service information is non-real-time information that need not be transmitted to the user in real-time, the control unit 201 controls the transmission/reception unit 204 to distribute the selected service information to a mail address set as a destination address to which non-real-time information that need not be confirmed by the user in real-time is distributed. For example, the mail address set herein as the destination address to which the non-real-time information is distributed is the mail address of the personal computer 108. The selected service information is distributed to the personal computer 108.

According to an aspect of the embodiment, the control unit 201 deletes the card use information, the user information, and the service information from the storage unit 202 if it determines that the service information has been distributed.

Figure 3:
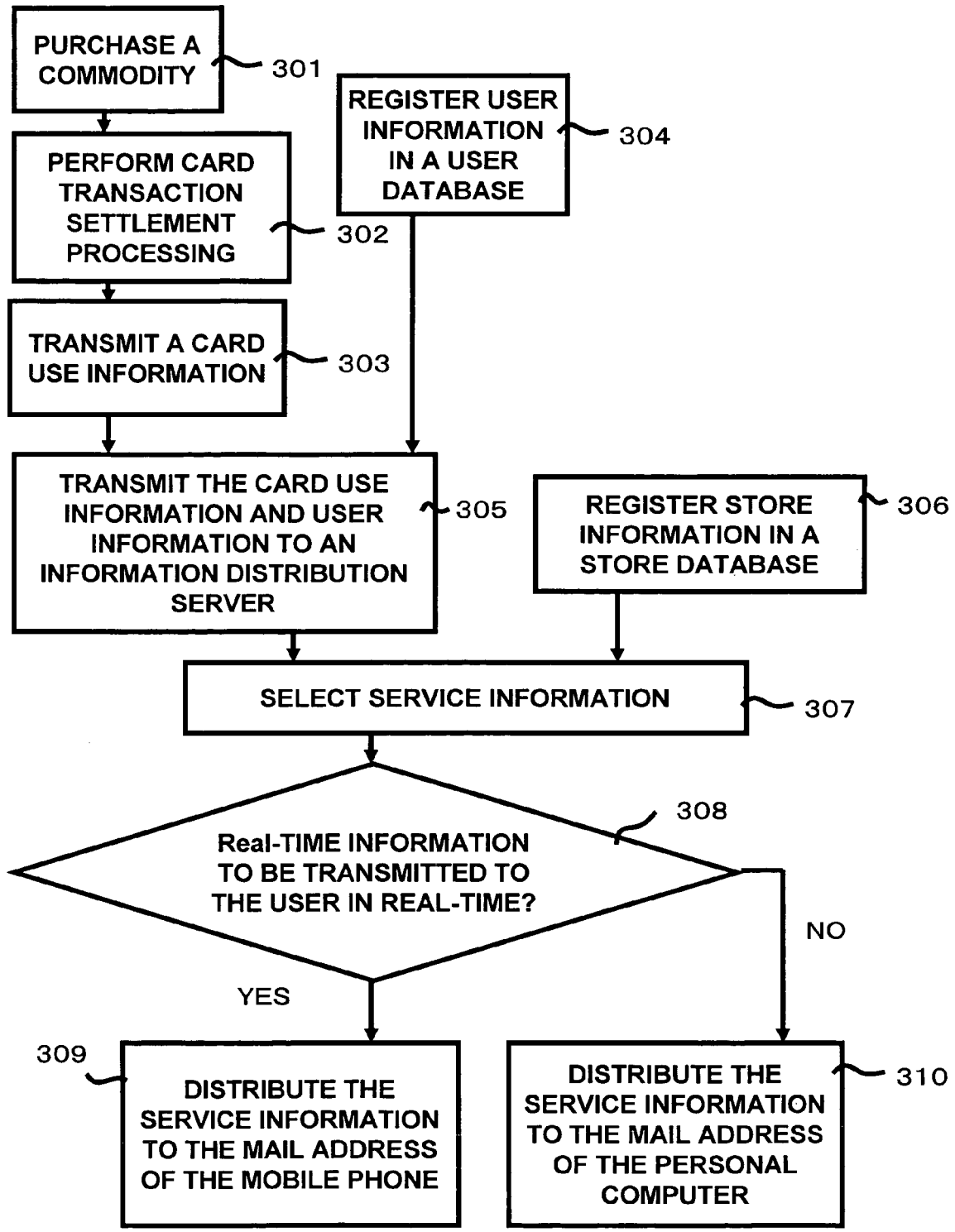
FIG. 3 is a flowchart showing an information distribution process according to an embodiment of the present invention.

FIG. 3 is a flowchart showing an information distribution process according to an embodiment of the present invention.

First, a user purchases a commodity at a store using a card (step 301). The card transaction settlement processing apparatus 101 at the store performs card transaction settlement processing (step 302).

The card transaction settlement processing apparatus 101 transmits the card use information to the card transaction settlement server 102 (step 303). If there is predetermined information, such as the purchase limit up to which the card can be used or the expiration date, the information such as the outstanding balance to the purchase limit or the expiration date is also transmitted together with the card use information to the card transaction settlement server 102.

The user inputs user information, for example, on a web site of a card company by using mobile phone 107 or personal computer 108. Then the card company registers user information in the user database 103 via the card transaction settlement server 102, such as user's interests, frequently used stores (stores in a frequently used category), and delivery mail addresses desired by the user (step 304). The card transaction settlement server 102 can set the user information, including user card use information, in the user database 103. According to an aspect of the embodiment, the user information has also user ID 401 (not shown in FIG. 5) in user information 400. When the card transaction settlement server 102 receives the card use information from the card transaction settlement processing apparatus 101, the card transaction settlement server 102 refers to user ID 401 in card use information 400 and retrieves the user information 500 which has the same user ID 401 in the card use information 400.

The card transaction settlement server 102 transmits the card use information and user information based upon the card transaction settlement processing apparatus 101 to the information distribution server 104 (step 305). The card use information and the user information may be combined into a new single form of information, and may be transmitted to the information distribution server 104.

A card company or the like registers service information in the store database 105 (step 306) via the information distribution server 104. The information distribution server 104 can set the service information in the store database 105. The card company may set a dedicated connection between a dedicated server for indicating to register service information in the store database 105.

The information distribution server 104 receives the service information from the store database 105, and selects service information to be transmitted to the user based on the card use information 400 and user information 500 received from the card transaction settlement server 102 (step 307). In selecting service information 600, the control unit 201 collates the service information 600 with the user information 500 such as the user's interests and the frequently used stores (the stores in the frequently used category), and selects service information 600 to be transmitted to the user. According to an aspect of the embodiment, the step of step 307, the information distribution server 104 might not refer to real-time/non-real-time information 608 in the service information 600.

The service information stored in store database 105 contains items related to the user information (hereinafter referred to as "user information-related items") beforehand, and a flag 609 corresponding to a user information-related item is set for a store if applicable. For example, a flag 609 includes a movie flag 6091, a music flag 6092, an art flag 6093, and a clothes flag 6094. The interest data 501 "movie", "music", "art" and "clothes" are included and the service information can be CD service information. If the service information contains the user information-related item "music", a music flag 6092 corresponding to the item is set for the service information of the store. Therefore, if the information distribution server 104 receives the user information in which the interest data 501 includes "music", the information distribution 104 retrieves the service information in which a flag corresponding to "music" is set. The information distribution server 104 refers to the interest data 501 and retrieves the service information which has a flag corresponding to the interest data 501.

If the user's interest in the user information is music, "music" is set in the user information-related item, and service information at which a flag corresponding to the item "music" is set, i.e., service information, is selected. Likewise, if the user's interest in the user information is movie, service information including the user information-related item "movie" is selected. The process for selecting service information to be transmitted to the user from the service information is performed by the control unit 201. The processes performed by a service information selecting unit is performed by the control unit 201 in this embodiment.

The information distribution server 104 refers to the purchase time 404 and/or a current time when the information distribution server 104 is prepared to distribute service information to the first destination mail address 503 or the second destination mail address 504, and refers to real-time/non-real-time effective information 608 to determine a distribution mode of effective the service information for the user. Moreover, the information distribution server 104 determines whether the selected service information is real-time information to be transmitted to the user in real-time or non-real-time information that need not be transmitted to the user in real-time (step 308). The service information includes real-time/non-real-time information 608 for determining whether the service information is real-time information to be transmitted to the user in real-time or non-real-time information that need not be transmitted to the user in real-time. According to an aspect of the embodiments, real-time/non-real-time effective information 608 is information based upon which to determine an effective distribution mode for the selected service information (effective from perspective of the user, the card provider, and/or the information provider). According to an aspect of the embodiments, the information provider and/or information distributor (e.g., 104, 105) sets a distribution type or mode of service information to be distributed. According to an aspect of the embodiments, the information provider sets a distribution type of service information to be distributed, based upon card use information, based upon user profile, or based upon other information or determination or intention, or any combinations thereof. According to an aspect of the embodiments, the user can also via information receipt profile of the user can set or influence the information distribution mode.

For example, the service information 600 stored in the store database 105 can also have a flag corresponding to information indicating whether the service information is real-time information to be transmitted to the user in real-time or non-real-time information that need not be transmitted to the user in real-time. For example, the flag is set when the service information is the real-time information, and the flag is not set when the service information is the non-real-time information.

The control unit 201 refers to the flag to determine whether the service information is the real-time information or the non-real-time information. The processing performed by a destination address selecting unit is performed by the control unit 201 in this embodiment.

If the selected service information is the real-time information, the information distribution server 104 distributes the service information to the mail address desired by the user to which the real-time information is to be distributed (e.g., the mail address of the mobile phone 107) (step 309).

If the selected service information is the non-real-time information, the information distribution server 104 distributes the service information to the mail address to which the information the user desires to confirm later is to be distributed (e.g., the mail address of the personal computer 108) (step 310). These mail addresses are included in the user profile information 103.

Therefore, when service information is distributed in association with card transaction settlement, it is determined whether the service information to be distributed is information to be reported in real-time based on the card use information, the user profile and the service information conditions, and the service information can more effectively be distributed to the user.

In this embodiment, the card use information and the service information are stored in physically different databases, i.e., the user database 103 and the store database 105. However, the card use information and the service information may collectively be managed by a single database. Further, while the operation of the card transaction settlement server 102 to receive the card use information from the card transaction settlement processing apparatus 101 and to manage the card use information and the operation of the information distribution server 104 to distribute service information to the user are performed by physically different servers, these operations may collectively be performed by a single server.

Further, the information distribution server 104 may directly receive the user information from the user database 103. In this case, the user database 103 may transmit the user information to the information distribution server 104 according to an instruction from the card transaction settlement server 102 or according to an instruction from the information distribution server 104.

Next, a more specific example is described, according to which, if the user purchases a CD at a store, the information distribution server 104 distributes a service information 600 relating to the CD or some kind of content (e.g. music) to predetermined mail addresses. For example, the user information 500 has interest data 501 that is "music", store data 502 that is "FUJITSU STORE No. 1 branch", the first destination mail address 503 that is the mail address of the mobile phone 107, the second destination mail address 504 that is the mail address of the personal computer 108. Time when the user purchases the CD is "13:00, Aug. 14, 2006" and to the real-time/non-real-time effective information 608. The real-time/non-real-time effective information 608 is information associated with service information to determine whether to designate the service information 600 when selected for real-time or non-real-time distribution mode to the user-associated real-time or non-real-time destination addresses, based upon user transaction information, for example, card use information, including a transaction time, a current time of distribution, or the selected service information 600 real-time/non-real-time effective information 608, or any combinations thereof. According to an aspect of the embodiments, the real-time/non-real-time effective information 608 can be an effective time for the service information, for example, a start time or availability time. The card use information 400 has user ID 401 that is "12345", purchased commodity 402 that is "CD of FUJI TARO", purchase cost 403 that is "30 dollars", purchase time 404 that is "13:00, Aug. 14, 2006", purchase location 405 that is "FUJITSU STORE No. 2 branch".

The user purchases a "CD of FUJI TARO" at "FUJITSU STORE No. 2 branch" at "13:00, Aug. 14, 2006". The card transaction settlement processing apparatus 101 at "FUJITSU STORE No. 2 branch" performs card transaction settlement processing. Then, the card transaction settlement processing apparatus 101 sends the card use information 400 to the card transaction settlement server 102. When the card transaction settlement server 102 receives the card use information 400 from the card transaction settlement processing apparatus 101, the card transaction settlement server 102 refers to user ID "12345" in the card use information 400. The card transaction settlement server 102 calls up the user information 500 corresponding to the user ID "12345". Here, the user information has also user ID "12345". The user has or inputs user information 500 on a web site of a card company by using mobile phone 107 or personal computer 108, and the card company registers user information 500 in the user database 103 via the card transaction settlement server 102. The card transaction settlement server 102 sends the card use information 400 and the user information 500 to the information distribution server 104. The information distribution server 104 refers to the purchased commodity 402 "CD of FUJI TARO", the purchased cost 403 "30 dollars", the purchased time "13:00, Aug. 14, 2006", and the purchased location 405 "FUJITSU STORE No. 2 branch". Moreover, the information distribution server 104 refers to the interest data 501 "music", store data 502 "FUJITSU STORE No. 1 branch", and the information distribution server 104 retrieves service information 600 from the store database 105. The card company, which distributes the service information, registers service information 600 in the store database 105 via the information distribution server 104. The information distribution server 104 can set the service information in the store database 105.

The information distribution server 104 refers to the interest data 501 "music". Moreover, the information distribution server 104 retrieves service information 600 relating to music from the store database 105. For example, the service information, which is retrieved by the information distribution server 104, indicates a music event held in "FUJITSU STORE No. 3 branch" near "FUJITSU STORE No. 2 branch", at "18:00, Aug. 14, 2006". The service information 600 has an affiliated-store name 601 that is "FUJITSU STORE No. 3 branch", an affiliated-store location 602 that is "the location of FUJITSU STORE No. 3 branch", an affiliated store address 603 that is "the telephone number of FUJITSU STORE No. 3 branch", bargain information 604 that is "a discount ticket for the music event", a dealing-store name 605 that is "NOTHING", a dealing-store location 606 that is also "NOTHING", a dealing store address 607 that is also "NOTHING", real-time/non-real-time information 608 that is the information indicating the service information is real-time information to be transmitted to the user in real-time. The information distribution server 104 refers to the purchase time "13:00, Aug. 14, 2006". The selected service information effective time is the starting time of the music event; "18:00, Aug. 14, 2006". The information distribution server 104 subtracts a current time when the information distribution server 104 distributes the service information 600 and/or the purchase time from the effective time "18:00, Aug. 14, 2006". The information distribution server 104 determines that the calculated time is less than a predetermined time which is, for example, set on 24 hours and a positive number. The information distribution server 104 selects the first destination mail address 503 to which the service information 600 is distributed and distribute the selected service information as real-time service information. In other words, the selected service information effective time is information based upon which to determine real-time/non-real-time distribution mode. According to an aspect of the embodiments, the real-time/non-real-time effective information 608 can be an effective time (time sensitive or availability data), an intention (e.g., emergency, critical, time sensitive, available, or on a watch list, information that is pre-designated for real-time or quick distribution), or any other information, or any combinations thereof. The service information stored in the store database 105 has a flag corresponding to information indicating whether the service information is real-time information to be transmitted to the user in real-time or non-real-time information that need not be transmitted to the user in real-time. The information distribution server 104 sets the flag to on, which means the service information is real-time information.

If service information 600 indicates a bargain sale held in all FUJITSU STORES, from Sep. 1st 2006 to Sep. 8th 2006, affiliated-store names 601 are "all FUJITSU STORES", affiliated-store locations 602 are "the locations of all FUJITSU STORES", affiliated store addresses 603 are "the telephone numbers of all FUJITSU STORES", bargain information 604 is "a bargain sale held in all FUJITSU STORES, in Sep. 1-8 2006". Dealing-store names 605 are "all FUJITSU STORES", Dealing-store locations 606 are "the locations of all FUJITSU STORES", Dealing store addresses 607 are "the telephone numbers of all FUJITSU STORES". Real-time/non-real-time information 608 is "the information which need not be transmitted to the user in real-time".

The described embodiment processes are implemented in software and/or computing hardware. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An apparatus comprising:
 an information distribution server to receive service information corresponding to a service to be offered to a user, the service information including identification information that indicates a transmission mode of the service information and the transmission mode being one or more of a real-time transmission mode, a non real-time transmission mode; and
 an electronic transaction server to store user information including a user destination address associated with a transmission mode;
 wherein the information distribution server selects a user destination address included in the user information according to the transmission mode included in the received service information and sends information based on the received service information to the user destination address selected according to the transmission mode.

2. The apparatus of claim 1, wherein the real-time transmission mode for service information is for service information capable of quick delivery to the user.

3. The apparatus of claim 1, wherein the real-time transmission mode for service information is determined according to user information indicative of interest of the user.

4. The apparatus of claim 1, wherein a user destination address associated with a real-time transmission mode is for a mobile wireless communication device.

5. The apparatus of claim 1, wherein the real-time and/or non-real-time transmission mode for service information is selected and/or determined according to store location, transaction time, user identification, purchased commodity, or any combinations thereof.

6. The apparatus of claim 1, wherein the real-time transmission mode for service information is based upon availability or time sensitivity of information.

7. The apparatus according to claim 1, wherein the service information comprises real-time/non-real-time effective information to determine whether to designate a transmission mode of service information for real-time and/or non-real-time distribution, based upon transaction information, a current time of distribution, and/or the service information real-time/non-real-time effective information.

8. An information distribution method comprising:
receiving service information corresponding to a service to be offered to a user, the service information including identification information that indicates a transmission mode of the service information and the transmission mode being one or more of a real-time transmission mode, a non real-time transmission mode;
storing user information including a user destination address associated with a transmission mode;
selecting a user destination address included in the user information according to the transmission mode included in the received service information; and
sending information, based on the received service information to the user destination address selected according to the transmission mode.

9. A computer-readable recording medium that stores a computer program for distributing an information by controlling an information processing apparatus according to a process comprising:
receiving service information corresponding to a service to be offered to a user, the service information including identification information that indicates a transmission mode of the service information and the transmission mode being one or more of a real-time transmission mode, a non real-time transmission mode;
storing user information including a user destination address associated with a transmission modes;
selecting a user destination address included in the user information according to the transmission mode included in the received service information; and
sending information based on the received service information to the user destination address selected according to the transmission mode.

* * * * *